No. 720,440. PATENTED FEB. 10, 1903.
H. C. KARPENSTEIN.
SAFETY HEEL FOR FOOTWEAR.
APPLICATION FILED OCT. 12, 1901.
NO MODEL.
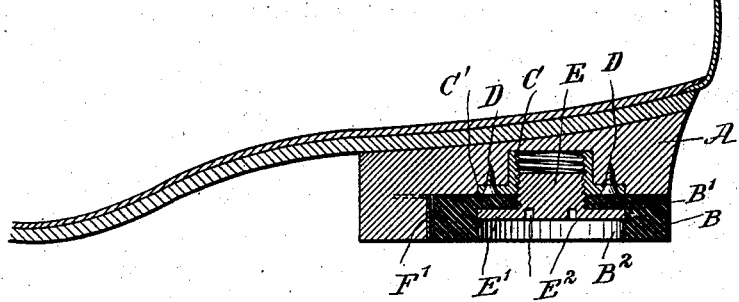
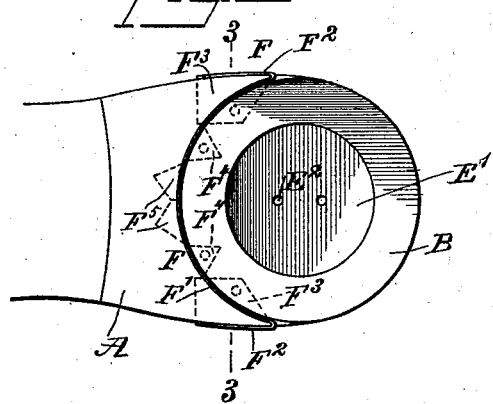
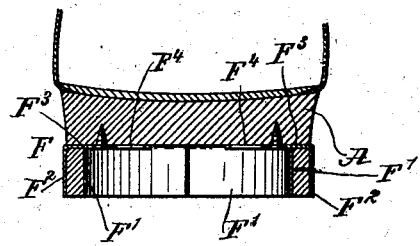
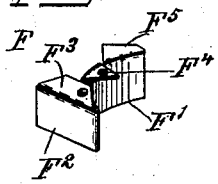
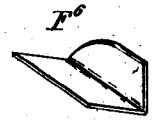
WITNESSES:
INVENTOR
Henry C. Karpenstein
BY
ATTORNEYS

UNITED STATES PATENT OFFICE.

HENRY C. KARPENSTEIN, OF BROOKLYN, NEW YORK.

SAFETY-HEEL FOR FOOTWEAR.

SPECIFICATION forming part of Letters Patent No. 720,440, dated February 10, 1903.

Application filed October 12, 1901. Serial No. 78,451. (No model.)

*To all whom it may concern:*

Be it known that I, HENRY C. KARPENSTEIN, a citizen of the United States, and a resident of the city of New York, borough of Brooklyn, in the county of Kings and State of New York, have invented a new and Improved Safety-Heel for Footwear, of which the following is a full, clear, and exact description.

The invention relates to heels having rubber treads; and its object is to provide a new and improved heel for footwear to prevent the user from slipping on wet, smooth, or icy surfaces and to allow the user to conveniently and quickly adjust the tread in case one side thereof is worn more than the other, the arrangement also permitting easy removal of a worn-out tread and substitution of a new one.

The invention consists of novel features and parts and combinations of the same, as will be fully described hereinafter, and then pointed out in the claims.

A practical embodiment of the invention is represented in the accompanying drawings, forming a part of this specification, in which similar characters of reference indicate corresponding parts in all the views.

Figure 1 is a longitudinal sectional elevation of the improvement as applied. Fig. 2 is an inverted plan view of the same. Fig. 3 is a transverse section of the same on the line 3 3 of Fig. 2, the tread being omitted. Fig. 4 is a perspective view of the corner-protector, and Fig. 5 is a like view of a modified form of the same.

A heel-body A, of leather or similar material, is secured to a shoe, boot, or like footwear in the usual manner, and the said heel-body has its bottom at the rear end cut out to form a circular recess for the reception of a turnable and removable tread B, preferably of ring shape and made of rubber or other elastic material. In order to hold the tread B in position on the heel-body A, the following device is provided: A nut C, having an annular flange C', is let into the bottom of the heel-body at the center of the cut-out portion, and the said nut is secured by suitable screws D to the heel-body, the screws passing through the flange C' into the body material. (See Fig. 1.) Into the nut C screws the threaded shank E of a screw having a head E', preferably made circular in shape, the said shank E passing through an aperture B' in the center of the tread B, and the said head E' extending into a bore $B^2$, concentric with the aperture or bore B'. The flange E' of the screw rests on the shoulder formed between the bores B' and $B^2$, and the under side of the head E' is a distance from the under side of the tread B, so as to form with the said head a suction-cup to cause the under surface of the tread B to firmly adhere to a wet or slippery surface. In the head E' are formed recesses $E^2$, adapted to be engaged by a wrench or other suitable tool to permit the user to readily screw the screw into the nut C or out of the same. When it is desired to fasten the tread B in place in the cut-out portion of the heel-body A, the screw E is inserted in the bores of the tread, and then the latter is placed in position in the cut-out portion and the screw is screwed up, so that the shank E screws in the nut C. In case one side of the tread B is worn more than the rest of the tread, the operator simply loosens the screw by applying a wrench in the recesses $E^2$ and then turns the tread B to bring the worn-out portion to the other side and to bring the less-worn portion to that side of the shoe or boot worn most by the wearer. When the desired adjustment has been made, the screw is again screwed up to securely hold the tread B in place. When the tread is completely worn out, the operator unscrews the screw completely from the nut C and removes it from the worn-out tread and applies it to a new tread, which is then secured in position on the heel-body A, as above described.

In order to protect the corners of the heel-body A at the cut-out portion, I provide suitable metallic protectors F, each formed with a segmental portion F', fitting between the body A and the inner peripheral edge of the tread B, as plainly shown in Figs. 1 and 2. The segmental portion F' terminates at its outer end in a flange $F^2$, engaging the face of the heel-body A, so as to protect the corner portion of the heel-body at the cut-out portion. In order to securely hold the protectors F in place, I provide the same with flanges $F^3$, adapted to be driven into the heel-body material, (see Fig. 2,) the said flanges F³ having a projecting portion to permit of securing the same to the bottom of the heel-body A at the cut-out portion. (See Fig. 3.) A similar tacking-flange F⁴ is formed at the inner edge of the segmental portion F', and a projecting lug F⁵ is formed on the inner end of the segmental portion F' to be driven into the material of the heel-body A. (See Fig. 2.) Two segmental portions F' of the two corner-protectors preferably meet at the center of the shoulder formed by the cut-out portion of the heel-body, as plainly indicated in Fig. 2, thereby lying close to that peripheral part of the tread B extending on the inside of the heel-body. (See Fig. 2.)

The corner-protectors F mentioned may be differently constructed—for instance, in the shape of an angle-iron F⁶, as indicated in Fig. 5, one part of the flange being driven into the material of the heel-body and the other engaging the outer face of the corner.

Having thus described my invention, I claim as new and desire to secure by Letters Patent—

1. A heel comprising a heel-body having a circular cut-out portion at its bottom, segmental metallic protectors applied to the corners of said heel-body and having the projecting spurs embedded in the heel-body and the end-protecting flanges arranged to overlap the sides of the said heel-body, and a tread removably secured to the heel-body and fitting the segmental portions of the said corner-protectors.

2. A heel, comprising a heel-body having a circular cut-out portion at its bottom, an annular tread fitting the cut-out portion and secured to the said heel-body, and corner-protectors for the corners of the heel-body at the cut-out portion, the protectors having segmental portions fitting the segmental wall and cut-out portion, as set forth.

In testimony whereof I have signed my name to this specification in the presence of two subscribing witnesses.

HENRY C. KARPENSTEIN.

Witnesses:
JNO. M. RITTER,
THEO. G. HOSTER.